Sept. 3, 1935.  I. B. LESLIE  2,013,059
LICENSE TAG
Filed Jan. 18, 1934  2 Sheets-Sheet 1
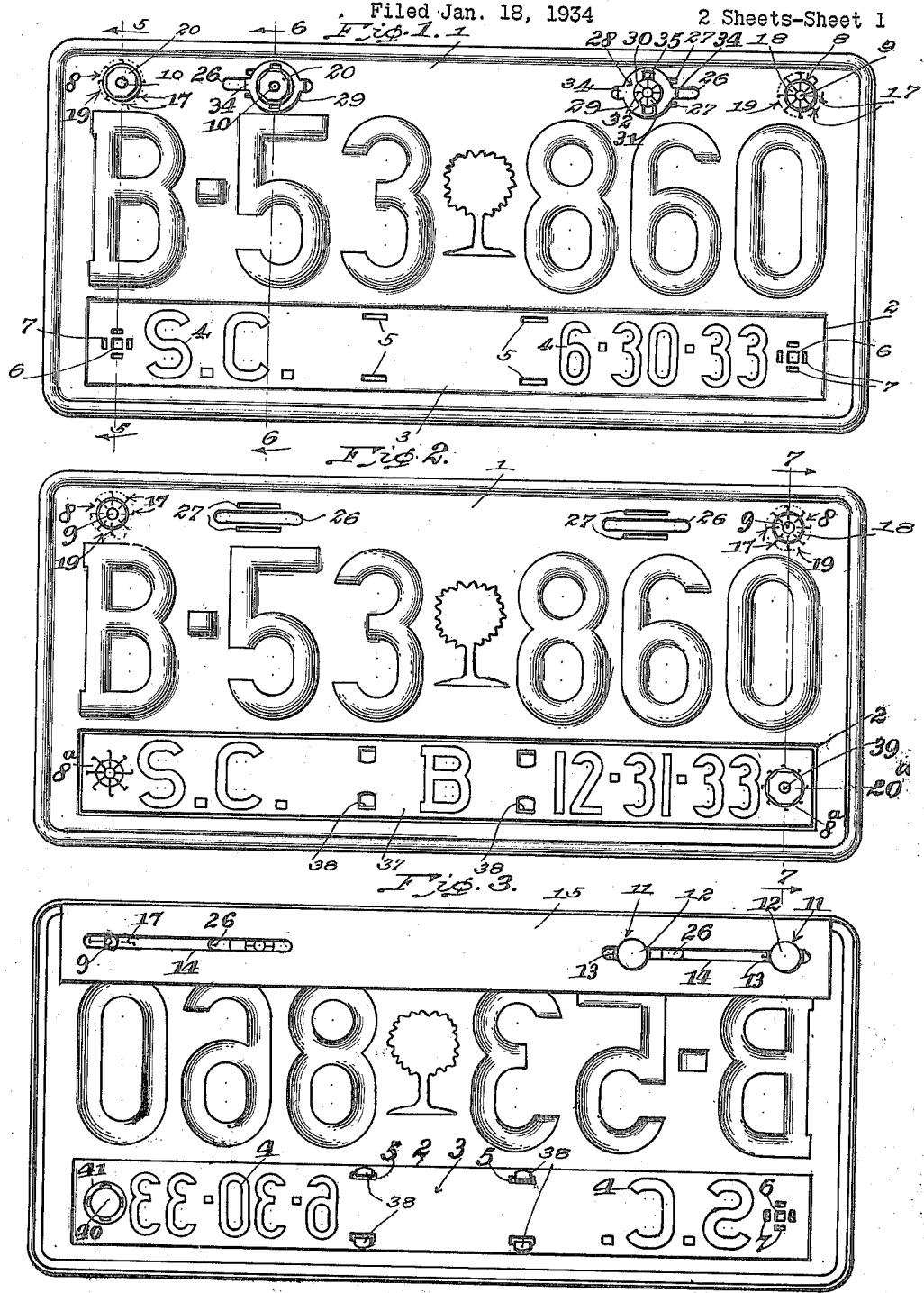

Sept. 3, 1935.  I. B. LESLIE  2,013,059
LICENSE TAG
Filed Jan. 18, 1934   2 Sheets-Sheet 2
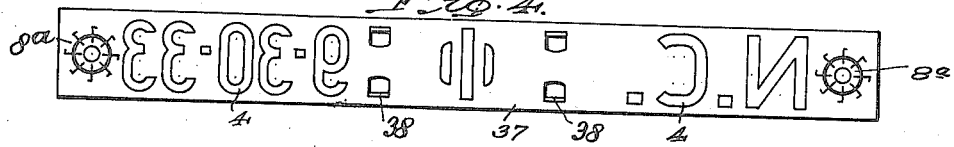
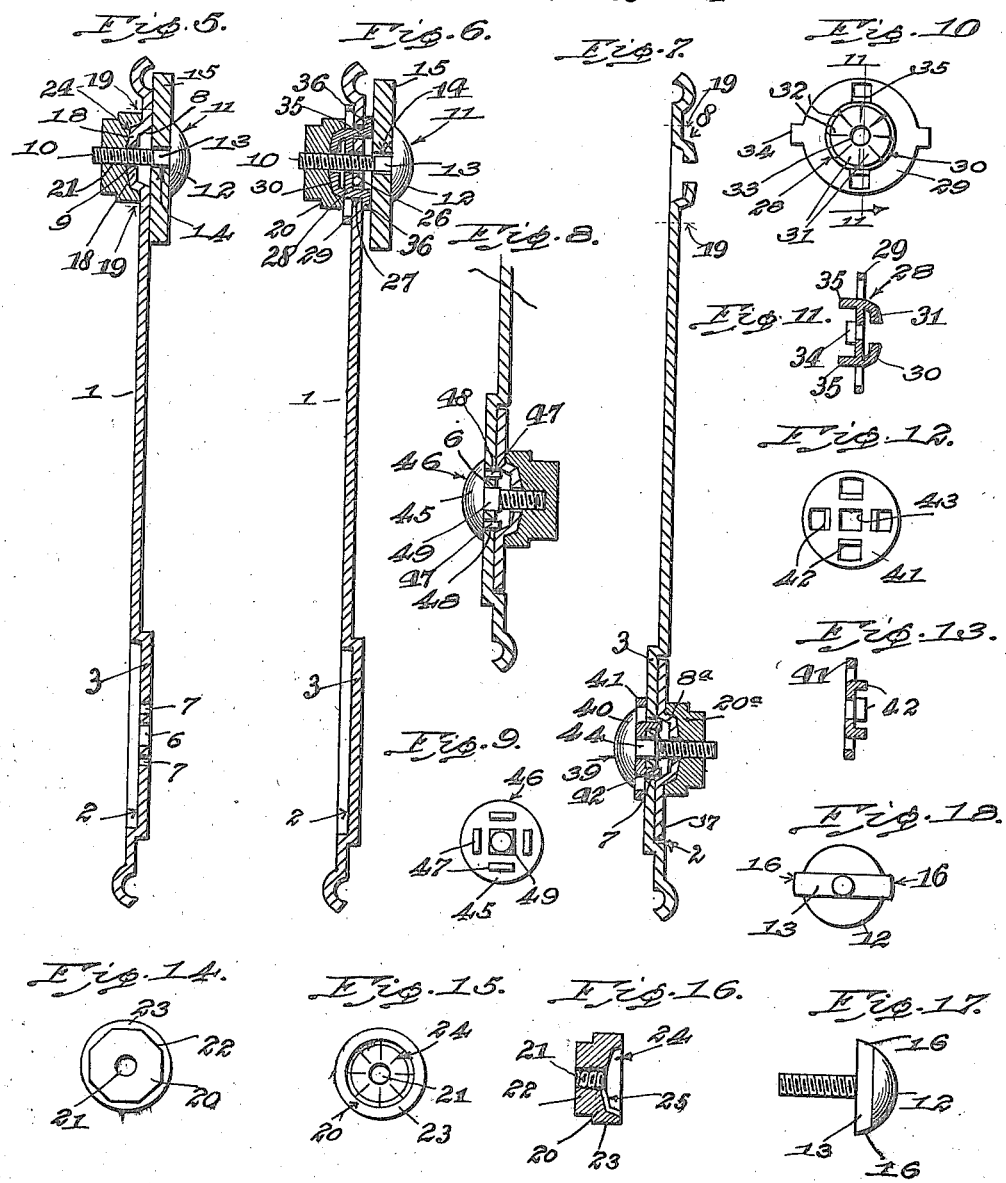
INVENTOR
Irvine B. Leslie
ATTORNEYS Patented Sept. 3, 1935

2,013,059

UNITED STATES PATENT OFFICE 2,013,059

LICENSE TAG

Irvine B. Leslie, Newberry, S. C.

Application January 18, 1934, Serial No. 707,209

15 Claims. (Cl. 40—125)

This invention relates to improvements in license tags for vehicles, especially automobiles, and its objects are as follow:—

First, to provide a license tag intended to be originally made so as to be good for a fractional period of time after being initially issued, then revalidated by the attachment of an auxiliary plate for an additional period.

Second, to group the original legalizing indicia in a sunken panel in the main body of the license tag, this indicia being in the form of raised characters which are intended to serve the purpose of grips, in a manner of speaking, against the subsequently attached auxiliary license tag.

Third, to carry forward the principle defined above to the extent of making the characters, in part at least, on the main body and the auxiliary license plate interlock, this being accomplished by reversing the embossings in the sunken panel and auxiliary license tag as later brought out.

Fourth, to provide interdependent formations on the main body of the license tag as well as on the auxiliary license tag and on the nut and/or the washer used in conjunction therewith in the making of a lock intended to render removal difficult.

Fifth, to combine both the main body and auxiliary license tag with a frangible part which will become mutilated upon reversely turning the nut with sufficient force, and thereby make obvious the fact that the tag has been tampered with.

Sixth, to make the foregoing formation on the main body and auxiliary license tag as a ratchet with which at least one tooth in the formation of the nut interlocks to resist reverse turning.

Seventh, to provide the main body with an arrangement of slots, usually parallel but not necessarily so, also for the purpose of showing mutilation upon an attempt to reversely turn the companion securing nut.

Eighth, to provide a license tag that cannot be removed from the vehicle without mutilating either tag or bolt.

In the drawings:—

Figure 1 is a front elevation of the main body of the improved license tag, particularly illustrating the types of securing devices intended to be used in connection therewith, as well as the sunken panel with its embossed characters legalizing the tag for a fractional period from the date of issuance.

Figure 2 is a similar front elevation of the same tag, particularly illustrating the addition of the auxiliary license tag.

Figure 3 is a rear elevation of the tag in Figure 2.

Figure 4 is a rear elevation of an auxiliary tag of the type shown in Figure 2.

Figure 5 is a detail section taken on the line 5—5 of Figure 1.

Figure 6 is a cross section taken on the line 6—6 of Figure 1.

Figure 7 is a cross section taken on the line 7—7 of Figure 2.

Figure 8 is a detail sectional view illustrating a modification of the bolt shown in Figure 7.

Figure 9 is a detail elevation of the bolt in Figure 8.

Figure 10 is an elevation of the lock washer.

Figure 11 is a cross section taken on the line 11—11 of Figure 10.

Figure 12 is an elevation of the lock washer in Figure 7.

Figure 13 is a detail section of the same lock washer.

Figure 14 is a top plan view of either of the nuts in Figure 1.

Figure 15 is an inverted plan view of the same nut.

Figure 16 is a cross section of the foregoing nut.

Figure 17 is a side elevation of the bolt, particularly showing the key which fits in a slot in the license tag bracket.

Figure 18 is an end view of the bolt showing how the key slightly overlaps the rim of the head.

One of the chief purposes of the invention is to originally issue a license tag which will be good for a stated period, usually only a fraction of a year, and to revalidate the tag by the subsequent addition of auxiliary license tags. This may be made to go on for an indefinite length of time so that the original tag is virtually an inseparable part of the vehicle for which it was issued. The subsequently issued license tags are not piled upon each other as might be supposed, but are intended to be taken off to make room for their successors there being provision, however, for insuring the mutilation of the auxiliary tag when taking it off so that there will not be any chance of its reuse or the possibility of its being switched to any main tag during the period of its validity.

In Figure 1 the main body of the license tag is designated 1. The face of the tag is pressed in at 2 to compose what has been termed the sunken panel 3. In performing the pressing the panel 2 will be equipped with characters 4, slots 5 and holes 6 around which openings in the form of short slots 7 are grouped substantially as shown.

The characters 4 are intended to be embossed, and according to present contemplation they are embossed on the side of the panel 3 nearest to the observer, in other words the raised parts are in the pressed in place 2. The purpose of this arrangement is to provide a friction grip on the auxiliary license tag later described. But it is also contemplated that the characters 4 shall be embossed the other way, that is to say, sunken into the panel 3 so that the raised parts appear on back.

In an instance such as this certain characters on the auxiliary license tag would interlock with the characters 4, and produce the same effect of preventing any free motion of the auxiliary license tag with respect to the main body 1.

A securing device for the main body 1 may take either of two forms, each of which is illustrated in Figure 1 so that the advantage of comparison may be had. In the first form the main body 1 is struck up from the back as at 8 to form a hollow boss (Fig. 5). This boss has a central hole 9 to let the shank 10 of a bolt 11 through, the bolt including a head 12.

The flat side of the head is made with a key 13 (Figs. 5, 17 and 18). This key fits in a slot 14 in a bracket 15 which is to be regarded as standard equipment and is the support for the main body 1. The interengagement of the key with the slot prevents turning of the bolt. The key projects beyond the boundary of the head 12 as at 16 (Figs. 17 and 18) so as to increase the extent of the key in the slot and make more difficult the removal of the bolt should anyone attempt to cut a screwdriver kerf in the head 12 with the idea of unscrewing the bolt from its nut.

In practice it is intended to make the threads of the shank 10 as well as the threads of the complemental nut of some special pitch so as to compel using the particular bolt and nut in combination. This provision is intended to take care of a situation in which a person might file off or otherwise remove the head 12 to a point flush with the back of the bracket 15, and by doing so become able to slip the shank forwardly and so undue the nut. While this makes it possible to remove the license tag from the bracket yet the remounting of a substitute tag is not readily possible because of the mutilation of the first bolts. It is intended to make bolts and nuts such as shown available only at authorized sources, for example, the highway department, the whole underlying purpose being to make it as difficult as possible for unauthorized persons to switch tags.

Going back to the struck-up boss 8, this is provided with a plurality of cuts 17 (Figs. 1 and 2) usually radiating from the center of the hole 9, but not necessarily so, the material between cuts being displaced or so formed as to produce ratchet teeth. The material and teeth are designated 18 in Figures 1, 2 and 5. The cuts go completely through the metal, and they extend well past the base of the boss 8.

Their outer extremities terminate at what would comprise a circular zone 19 if said extremities could be connected, and in fact they are connected by a frangible or deformable section of the metal which can either be broken out, or at least mutilated upon a reverse pressure on the nut. In order to make the zone 19 more liable to tearing or deformation the metal of the main body may be weakened by perforations, indentations or the like.

The nut 20 (Figs. 1, 14, 15 and 16) which is a companion to the bolt 11 has a threaded hole 21 to take the shank 10. It has a non-circular top part 22, intended to receive a wrench of an appropriate kind for turning. Its bottom part 23 is recessed at 24 (Fig. 16) to conform to the general shape of the boss 8. The recess is toothed at 25 to match the teeth 18. Usually there will be as many teeth in the recess as on the boss, but one tooth in the recess 24 would produce a lock although not as satisfactory as herein intended.

Thus far it is easy to see that desiring to mount the main body of the tag on the bracket 15, the bolt 11 is introduced into the slot 14 from the rear (Fig. 5), the key 13 being made to seat in the slot. The shank 10 also goes through the boss 8 whereupon the nut 20 is applied from the front. As soon as the teeth 25 meet the teeth 18 there will be a ratchet action which will permit continued turning of the nut for a short time in the clockwise direction (or counter-clockwise should such threads be desirable) until a final lock is established.

Reverse turning of the nut is not easily possible. Should a person be intent on removing the tag without authority and place a wrench on the non-circular part 22, an applied force sufficient to break down the teeth would be far superior to the strength of the frangible or destructible zone 19. The latter would either be completely torn out or at least mutilated to such an extent as to make unauthorized tampering evident to anybody looking at the tag. Naturally if the zone 19 gives way to a limited extent, the unauthorized person will either be induced to stop or should he continue in his attempt he would actually tear out part of the tag and so render it virtually useless.

In Figure 1 the cuts 17 go completely into the central hole 9. In Figure 2 they stop short of the hole just a little. The reason for the slight difference in showing is that in some instances the material of the tag may be heavy and strong enough to permit cutting all the way through (Fig. 1) while in other instances the gauge of the material may be a little lighter so as to demand stopping the cuts (Fig. 2) short and so insuring sufficient strength.

Another type of securing device involves parallel slots in the main body 1. There is a large central slot 26 and two smaller slots 27, one on each side of the central slot. The companion bolt and nut assemblage is illustrated in Figure 6. The bolt 11 is identical with the bolt in Figure 5 in every respect excepting a little greater length. The nut 20 is also identical with the nut in Figure 5 in every respect. The boss 8 is substituted by a lock washer 28 (Figs. 10 and 11) which simulates the struck-up boss in construction and function.

To these ends the washer 28 comprises a disc 29, usually circular, having a central dome 30 formed with teeth 31 by cuts 32 which either go all the way into the hole 33 or not, according to the gauge of the metal. The teeth 31 interengage the teeth of the nut 20 (Fig. 6) and produce a lock precisely as before.

In order to adequately interlock the washer 28 with the main body 1 the disc 29 is provided with two sets of lugs 34, 35. The first set 34 is bent backwardly so as to enter the large slot 26. The second set 35 is also bent backwardly so as to enter the smaller slots 27. Thereafter these lugs are upset at 36 (Fig. 6). Now should an attempt be made to turn the nut 20 reversely, the foregoing interengagement of the two sets of lugs with the parallel slots would immediately so twist or mutilate the metal of the main body 1 as in the former instance, and so make it evident that the securing device has been tampered with.

According to the showing in Figure 1 the license tag is supposed to be issued for a six month period. Those of the characters 4 denoting the limit of that period are embossed directly in the license tag and form an integral part of it as has been brought out already. When that period has expired, an auxiliary license tag 37, either of the form in Figure 2 or Figure 4, will be inserted in the pressed in place 2 above the sunken panel 3 so as to hide the original indicia and show the new indicia which is intended to revalidate the tag for another period. This might be the remainder of the year or only a part of the year. This is not so material.

Tabs 38 (one or more) will be struck out of the auxiliary tag at such places as to enter the slots 5 and permit bending over on back (Fig. 3). The main purpose of the tabs and slots is to prevent buckling of the auxiliary tag in the middle.

Securing means, closely approximating the two types of securing means in Figures 1, 5 and 6, is used in so attaching the auxiliary tag 37 as to make evident a premature attempt at its removal. From this it will be understood that the main body 1 comprises the immediate support for the auxiliary tag.

To begin with the auxiliary tag 37 is composed of thinner material than the main body 1 so as to insure mutilation of the auxiliary tag, without any corresponding destruction to the main body, when the time arrives for unscrewing the nuts for the removal of the auxiliary tag and the replacement of a new one.

The auxiliary tag has a struck-up boss 8ª and a compansion nut 20ª, each identical in construction and function with the boss 8 and nut 20 described before. Parts already described in connection with the boss 8 and nut 20 (Fig. 5) are to be considered as existing in the combination at the bottom of Figure 7. The bolt 39 is on the order of a common carriage bolt, the only exception being special threads to match those in the nut 20ª.

The underside of the head 40 bears against a lock washer 41 (Fig. 12) which has lugs 42 struck out of it (Fig. 13) to fit into the group of short slots 7 (Fig. 1). The central hole 43 (Fig. 12) matches the hole 6 (Fig. 1) so that the shank of the bolt 39 may go through from back to front as shown in Figure 7.

Inasmuch as the bolt 39 is a common carriage bolt, as stated above, its shank is square in cross-section at the point 44. The holes 6, 43 (Figs. 1 and 12) match this square cross section, and since the lugs 42 occupy the slots 7 the bolt 39 is firmly held against turning under any ordinary circumstance. Should a person attempt to unscrew the nut 20ª (Fig. 7) the result will be a mutilation of the circular zone around the base of the teeth of the hollow boss as fully brought out above.

This, in fact, is desirable and intended in this particular instance at least at one time in the life of the auxiliary tag 37. The circumstances may be such that the original tag is to be revalidated for a period beyond the expiration of the auxiliary tag (Fig. 2). In other words, one might have revalidated the original tag once by attaching the auxiliary tag 37, and it might be desired to again revalidate the original tag by the application of another auxiliary tag.

In that case the tag shown in Figure 2 must come off. By applying a wrench to each of the nuts 20ª and turning counter-clockwise with sufficient force the boss 8 will either be mutilated and, conceivably, may be torn out into the shape of an oversized hole. It is then an easy matter to separate the bolt and nut assemblage and to mount a fresh auxiliary tag.

Figure 8 illustrates a modification of the arrangement at the bottom of Figure 7 according to which the flat face of the head 45 of the bolt 46 is provided with a plurality of projections 47, in the form of pins, tangs, lugs or the like, for the purpose of occupying correspondingly shaped openings 48 in the sunken panel of the license plate.

These openings correspond with the slots or openings 7 (Fig. 1), but instead of receiving the lugs (or equivalents) of a lock washer they receive the projections direct from the bolt itself. Otherwise the principle of assemblage and operation is the same as that already described. The square part 49 of the bolt 46 occupies the correspondingly shaped hole 6, and this together with the engagement of the projections and openings keeps the bolt from turning. The auxiliary license tag together with its boss and the nut are the same as previously described.

Figure 4 is intended largely to substantiate the identity of part of the securing device in the auxiliary license tag with that occurring on the main body itself. It has been brought out that either of two kinds of securing device can be used for attaching the main body to the bracket 15. Figure 4 is concerned with the type on the remote ends of the main body 1 (Fig. 1).

The struck-up or hollow boss 8ª (still using the same character for designating that part in Fig. 7) is illustrated as it appears when looking from the reverse side of the auxiliary tag, the tag 37 being reversed in Figure 4. The cuts and the resulting teeth are plainly shown, and it only remains to be stated that these teeth interlock with the teeth of the nut when the latter is screwed onto the bolt in the clockwise direction.

The only remaining difference in the auxiliary tag in Figure 4 from the other auxiliary tags is in the characters 4. It may further be stated that this tag may be varied in colors and that there may be a variation between the color of the tag itself and the characters on it, all for the purpose of maintaining necessary distinctions in the use of the invention.

I claim:—

1. The combination of a support, a license tag, a securing device worked in one way to make the attachment of the tag to its support, and a deformable section in the tag subject to mutilation upon working the securing device the reverse way, said device including a nut with means capable of producing said mutilation.

2. The combination of a support, a license tag having an opening, a bolt occupying the opening and having means by which it is secured with respect to the support, a securing device on the bolt and in interlocked engagement with the license tag to make the attachment of the tag to said support, and a deformable section in the tag with which the securing device has its interlock, said section being subject to mutilation upon working the securing device when once secured.

3. The combination of a support, a license tag, both the tag and the support having registering openings, a securing device including one part that goes through the openings and a second part that fits on the first part, and interlockable means mutually on the license tag and on said second part, said means interlocking when working said second part in one way to make the attachment.

4. The combination of a support, a license tag, both the tag and the support having registering openings, a securing device including one part that goes through the openings and a second part that fits on the first part, and interlockable means mutually on the license tag and on said second part, said means interlocking when working said second part in one way to make the attachment, the interlockable means on the tag having an adjacent frangible zone subject to deformation and being mutilated upon reversely working said second part.

5. The combination of a support, a license tag, said tag and support having registering openings, a securing device to make the attachment of the tag to said support, said device including a bolt having its shank going through the openings and having means to prevent turning with respect to the support, a nut screwed on the shank to press against the tag, and confronting interlocking means on the tag and nut making an interlock when turning the nut in one direction.

6. The combination of a support, a license tag, said tag and support having registering openings, a securing device to make the attachment of the tag to said suport, said device including a bolt having its shank going through the openings and having means to prevent turning with respect to the support, a nut screwed on the shank to press against the tag, and ratchet teeth on the nut and on the tag making an interlock when turning the nut in one direction.

7. The combination of a support, a license tag, said tag and support having registering openings, a securing device to make the attachment of the tag to said support, said device including a bolt having its shank going through the openings and having means to prevent turning with respect to the support, a nut screwed on the shank to press against the tag, ratchet teeth on the nut and on the tag making an interlock when turning the nut in one direction, and a frangible zone around that part of the interlocking means on the tag subject to mutilation upon an attempt to unscrew the nut.

8. The combination of a support, a license tag, a struck-up place in the tag forming a hollow boss, said boss and support having registering openings and said boss having plural cuts forming teeth, said teeth being formed to constitute ratchet teeth, a bolt fitted through said registering openings and having means making a non-turning connection with the support, and a nut screwed on the bolt, said nut having a recess with at least one tooth to interlock with the ratchet teeth upon turning the nut home.

9. The combination of a support, a license tag, a struck-up place in the tag forming a hollow boss, said boss and support having registering openings and said boss having plural cuts forming teeth, said teeth being formed to constitute ratchet teeth, a bolt fitted through said registering openings and having means making a non-turning connection with the support, a nut screwed on the bolt, said nut having a recess with at least one tooth to interlock with the ratchet teeth upon turning the nut home, and a frangible zone in the tag around the base of the teeth, subject to mutilation upon an attempt to unscrew the nut.

10. The combination of a support, a license tag, said support and tag having registering openings, the tag having additional openings at the sides of the first opening, a bolt having its shank going through the registering openings and having means to make a non-turning connection with the support, a lock washer against the tag having means to make a non-turning connection with the tag said means including lugs inserted in the additional openings, said washer having a central dome provided with ratchet teeth, and a nut screwed home on the shank and having at least one tooth to interlock with the teeth of the dome.

11. The combination of a support, a license tag comprising a main body having parallel slots, there being a large central slot and adjacent small slots, securing means by which to attach the tag to said support, said means comprising the following, a bolt shank going through the central slot and having means for making a non-turning connection with the support, a nut having a recess with at least one tooth, a lock washer situated between the nut and the tag, said washer having sets of lugs fitted into each of the slots, and an up-struck central dome in the lock washer having cuts forming teeth which are formed to make ratchet teeth with which the tooth of the nut interlocks.

12. A license tag having an up-struck part producing a hollow boss, there being cuts through the boss and through the surrounding part of the tag to make teeth, the material between cuts being displaced to constitute ratchet teeth.

13. A license tag having parallel slots, and a lock washer secured to the tag to form part of securing means for the tag, said washer having lugs engaging all of the slots, and an up-struck part of the washer having cuts, the material between cuts being displaced to form teeth, said teeth having a shape to constitute ratchet teeth.

14. A license tag comprising a main body including original indicia some of the characters of which validate the tag for a fractional period from the date of issuance, an auxiliary tag to hide said characters and having substitute characters for extending the validation for a subsequent period, a securing device by which to attach the auxiliary tag to the main body, said device comprising an up-struck boss on the auxiliary tag having ratchet teeth, a bolt going through the main body and through the boss and having means for making a non-turning connection with the main body, and a nut screwed on the bolt, said nut having at least one tooth to interlock with the teeth of the boss.

15. A license tag comprising a main body including original indicia some of the characters of which validate the tag for a fractional period from the date of issuance, said characters being embossed, an auxiliary tag to be superimposed on the aforesaid characters to hide them and to revalidate the license tag for an additional period, the characters on the auxiliary tag also being embossed so that some of them can interlock with the characters on the main body, and a securing device between the two tags comprising at least one bolt going therethrough, a nut on the bolt, and interlocking ratchet means on the bolt and auxiliary tag.

IRVINE B. LESLIE.